(12) United States Patent
Itoh (10) Patent No.: US 12,019,179 B2
(45) Date of Patent: Jun. 25, 2024

(54) ABNORMALITY DETECTION METHOD OF INFRASTRUCTURE SENSOR APPARATUS, INFRASTRUCTURE SENSOR APPARATUS, INFRASTRUCTURE SENSOR SYSTEM, AND NON-TRANSITORY COMPUTER READABLE MEDIUM STORING AN ABNORMALITY DETECTION PROGRAM

(71) Applicant: Toyota Jidosha Kabushiki Kaisha, Toyota (JP)

(72) Inventor: Masayuki Itoh, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 434 days.

(21) Appl. No.: 17/386,146

(22) Filed: Jul. 27, 2021

(65) Prior Publication Data
US 2022/0034999 A1 Feb. 3, 2022

(30) Foreign Application Priority Data

Jul. 29, 2020 (JP) .................... 2020-128432

(51) Int. Cl.
*G01S 7/40* (2006.01)
*G01S 13/91* (2006.01)
(Continued)

(52) U.S. Cl.
CPC ............ *G01S 7/40* (2013.01); *G01S 13/91* (2013.01); *G01S 19/01* (2013.01); *H04Q 9/00* (2013.01)

(58) Field of Classification Search
CPC .......... G01S 13/52; G01S 13/86; G01S 13/91; G01S 13/92; G01S 17/58; G01S 17/88;
(Continued)

(56) References Cited

U.S. PATENT DOCUMENTS

2017/0032671 A1* 2/2017 Toyama .................. G06F 21/64
2017/0352201 A1 12/2017 Kumabe
(Continued)

FOREIGN PATENT DOCUMENTS

JP 2010-127650 A 6/2010
JP 2017-033186 A 2/2017
(Continued)

*Primary Examiner* — Timothy X Pham
(74) *Attorney, Agent, or Firm* — Dinsmore & Shohl LLP (57) ABSTRACT

An abnormality detection method of an infrastructure sensor apparatus according to the present disclosure is an abnormality detection method of an infrastructure sensor apparatus configured to detect a mobile body that passes within a sensing range, the abnormality detection method including: calculating mobile body information at least including positional information and moving speed information on the mobile body based on information on the mobile body detected by the infrastructure sensor apparatus; calculating probe data at least including positional information and moving speed information on the mobile body based on self positional information of the mobile body received using a radio communication function included in the mobile body; and performing abnormality determination processing in which it is determined that there is an abnormality in the infrastructure sensor apparatus when the mobile body information does not match the probe data.

10 Claims, 5 Drawing Sheets

(51) Int. Cl.
*G01S 19/01* (2010.01)
*H04Q 9/00* (2006.01)

(58) Field of Classification Search
CPC ...... G01S 19/01; G01S 2205/01; G01S 5/145; G01S 7/003; G01S 7/40; G01S 7/4808; G01S 7/497; G06F 11/0736; G06F 11/0751; G06V 20/54; G08G 1/0116; G08G 1/097; H04Q 9/00; H04W 4/027; H04W 4/38; H04W 4/80
See application file for complete search history.

(56) References Cited

U.S. PATENT DOCUMENTS

| | | | |
|---|---|---|---|
| 2019/0108749 | A1 | 4/2019 | Gaither |
| 2019/0241194 | A1 | 8/2019 | Fukasawa et al. |
| 2019/0331758 | A1* | 10/2019 | Malkes ................ G01S 7/4004 |
| 2020/0298840 | A1* | 9/2020 | Shimotani ............ G08G 1/0112 |
| 2023/0343209 | A1* | 10/2023 | Ionescu ................ G08G 1/0116 |
| 2023/0350422 | A1* | 11/2023 | Suzuki .................. G05D 1/024 |

FOREIGN PATENT DOCUMENTS

| | | |
|---|---|---|
| JP | 2017-107590 A | 6/2017 |
| JP | 2018-180860 A | 11/2018 |

\* cited by examiner

ABNORMALITY DETECTION METHOD OF INFRASTRUCTURE SENSOR APPARATUS, INFRASTRUCTURE SENSOR APPARATUS, INFRASTRUCTURE SENSOR SYSTEM, AND NON-TRANSITORY COMPUTER READABLE MEDIUM STORING AN ABNORMALITY DETECTION PROGRAM

CROSS REFERENCE TO RELATED APPLICATIONS

This application is based upon and claims the benefit of priority from Japanese patent application No. 2020-128432, filed on Jul. 29, 2020, the disclosure of which is incorporated herein in its entirety by reference.

BACKGROUND

The present disclosure relates to an abnormality detection method of an infrastructure sensor apparatus, an infrastructure sensor apparatus, an infrastructure sensor system, and an abnormality detection program, and relates to, for example, an abnormality detection method of an infrastructure sensor apparatus that detects mobile bodies that travel on a road, an infrastructure sensor apparatus, an infrastructure sensor system, and an abnormality detection program.

In recent years, it has been performed to grasp situations on roads and the like and send various instructions to mobile bodies that travel on the roads or perform various kinds of control for the purpose of reducing traffic congestion. In this traffic system, an infrastructure sensor is used in order to grasp situations on the roads. The infrastructure sensor detects mobile bodies within a detection target range using an optical camera, a millimeter-wave radar, a Laser Imaging Detection and Ranging (LiDAR) or the like. In the traffic system, various kinds of control are performed based on information on the mobile bodies collected using the infrastructure sensor. In this case, in order to grasp the positions of the mobile bodies, it is required for a host system to correctly grasp the position of the infrastructure sensor. A technique regarding an installation sensor such as an infrastructure sensor is disclosed in Japanese Unexamined Patent Application Publication No. 2010-127650.

A mobile body position estimation system disclosed in Japanese Unexamined Patent Application Publication No. 2010-127650 is a system for estimating the position of a mobile body that travels in a measurement area, the system including measuring, by three or more distance sensors that are arranged in the measurement area in a dispersed manner, distances from the respective distance sensors to the mobile body, acquiring, by a position estimation calculation apparatus, a sensor measurement value at a given time from each of the distance sensors and accumulating the acquired values, giving a distance reliability indicating the degree of reliability in accordance with the distances to each of the sensor measurement values of the respective distance sensors acquired and accumulated, and estimating, using one of the sensor measurement values acquired and accumulated whose reliability is high, the position of each of the distance sensor and the mobile body. In the position estimation processing, calibration of the positions of the respective distance sensors and estimation of the position to which the mobile body has moved are performed using sensor measurement values obtained from two or more distance sensors provided at the respective positions before and after the movement of the mobile body.

SUMMARY

In the technique disclosed in Japanese Unexamined Patent Application Publication No. 2010-127650, however, there is a problem that an abnormality that has occurred in the infrastructure sensor apparatus cannot be detected and the reliability of the information acquired using the infrastructure sensor apparatus is low.

The present disclosure has been made in order to solve the above problem, and aims to detect an abnormality that has occurred in an infrastructure sensor apparatus and improve reliability of information obtained from the infrastructure sensor apparatus.

An aspect of an abnormality detection method of an infrastructure sensor apparatus according to the present disclosure is an abnormality detection method of an infrastructure sensor apparatus configured to detect a mobile body that passes within a sensing range, the abnormality detection method including: calculating mobile body information at least including positional information and moving speed information on the mobile body based on information on the mobile body detected by the infrastructure sensor apparatus; calculating probe data at least including positional information and moving speed information on the mobile body based on self positional information of the mobile body received using a radio communication function included in the mobile body; and performing abnormality determination processing in which it is determined that there is an abnormality in the infrastructure sensor apparatus when the mobile body information does not match the probe data.

An aspect of an infrastructure sensor apparatus according to the present disclosure includes: a sensor unit configured to acquire area information for grasping a situation within a sensing range set in a predetermined range using a sensor; a mobile body information calculation unit configured to extract a mobile body from the area information and calculate mobile body information at least including positional information and moving speed information on the mobile body; a probe data calculation unit configured to calculate probe data at least including positional information and moving speed information on the mobile body based on self positional information of the mobile body received using a radio communication function included in the mobile body; and an abnormality determination processing unit configured to perform abnormality determination processing for determining that there is an abnormality in the area information acquired by the sensor unit when the mobile body information does not match the probe data.

An aspect of an infrastructure sensor system according to the present disclosure includes: a sensor unit configured to acquire area information for grasping a situation within a sensing range set in a predetermined range using a sensor; a mobile body information calculation unit configured to extract a mobile body from the area information and calculate mobile body information at least including positional information and moving speed information on the mobile body; a probe data calculation unit configured to calculate probe data at least including positional information and moving speed information on the mobile body based on self positional information of the mobile body received using a radio communication function included in the mobile body; and an abnormality determination processing unit configured to perform abnormality determination processing for determining that there is an abnormality in the area information acquired by the sensor unit when the mobile body information does not match the probe data, in which at least the sensor unit is provided in an infrastructure sensor apparatus, the infrastructure sensor apparatus communicating with a host system that performs a plurality of processes regarding an operation of a system and arranged along a road where the mobile body travels.

An aspect of an abnormality detection program of an infrastructure sensor system according to the present disclosure is an abnormality detection program executed in an arithmetic apparatus provided in an infrastructure sensor system configured to detect a mobile body that passes within a sensing range, the abnormality detection program performing: mobile body information calculation processing for calculating mobile body information at least including positional information and moving speed information on the mobile body based on information on the mobile body detected by a sensor unit provided in the infrastructure sensor system; probe data calculation processing for calculating probe data at least including positional information and moving speed information on the mobile body based on self positional information of the mobile body received using a radio communication function included in the mobile body; and abnormality determination processing for determining that an abnormality is occurring in the infrastructure sensor system when the mobile body information does not match the probe data.

The abnormality detection method of the infrastructure sensor apparatus, the infrastructure sensor apparatus, the infrastructure sensor system, and the abnormality detection program according to the present disclosure detects an abnormality on the infrastructure sensor system based on positional information obtained from a mobile body that passes in a detection target range and self positional information acquired from the mobile body using a radio function.

In the abnormality detection method of the infrastructure sensor apparatus, the infrastructure sensor apparatus, the infrastructure sensor system, and the abnormality detection program according to the present disclosure, it is possible to easily detect an abnormality that occurs on an infrastructure sensor system.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

For clarity of explanation, the following descriptions and drawings will be appropriately omitted and simplified. Further, the respective components described in the drawings as functional blocks which perform various kinds of processing can be configured by Central Processing Units (CPUs), memories or other circuits in terms of hardware, and are achieved by programs loaded in memories, or the like in terms of software. Accordingly, it will be understood by those skilled in the art that these functional blocks can be implemented in various forms by only hardware, only software or a combination thereof. They are not limited to any of them. Incidentally, in the respective drawings, the same components are denoted by the same reference numerals, and dual description will be omitted as needed.

Further, the above-described program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

First Embodiment

Figure 1:
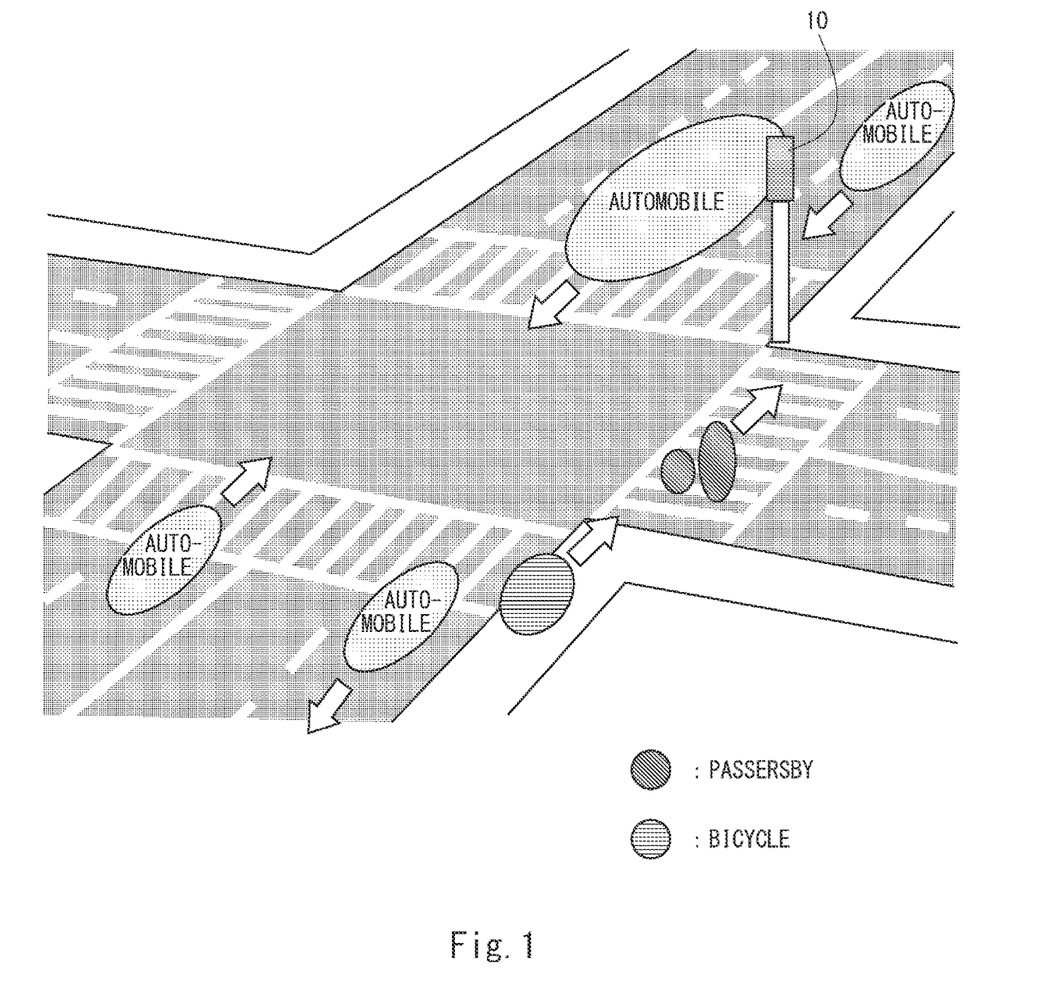
FIG. 1 is a configuration diagram regarding an infrastructure sensor apparatus of a traffic system according to a first embodiment.

First, FIG. 1 shows a configuration diagram related to an infrastructure sensor system 1 of a traffic system according to a first embodiment. The following description relates to a method of detecting an abnormality in an infrastructure sensor apparatus 10 used in the infrastructure sensor system 1 that grasps road situations by a traffic system.

As shown in FIG. 1, in the infrastructure sensor system 1, the infrastructure sensor apparatus 10 is used. The infrastructure sensor apparatus 10 is installed on a side of a road. The infrastructure sensor system 1 performs various kinds of control by detecting mobile bodies travelling on the road using the infrastructure sensor apparatus 10, thereby improving the efficiency of the whole traffic and improving safety. However, if the reliability of information acquired by the infrastructure sensor apparatus 10 in the infrastructure sensor system 1 is low, the reliability of the whole system is impaired, which is a problem. Therefore, it is desirable to provide system management for detecting, for example, an abnormality in the infrastructure sensor apparatus 10 and performing recovery processing from an abnormal state when there is an abnormality in the infrastructure sensor apparatus 10. In the following, a method of detecting an abnormality in the infrastructure sensor apparatus 10 will be described.

The infrastructure sensor apparatus 10 detects mobile bodies such as automobiles, bicycles, and passersby that are present within a sensing range using a visible light, a near infrared light, a far infrared light, a laser light, a millimeter-wave light or the like. FIG. 1 shows an example in which there are four automobiles, one bicycle, and two passersby within the sensing range. The infrastructure sensor apparatus 10 transmits information by which mobile bodies that are present within the sensing range can be determined to a host system.

Further, the infrastructure sensor system 1 according to the first embodiment acquires self position estimation information owned by a mobile body such as a person or an automobile from this mobile body. This self position estimation information is, for example, positional information acquired from a satellite positioning system (GNSS: global navigation satellite system) included in a smartphone owned by a person or a car navigation system provided in an automobile. The infrastructure sensor system 1 includes a function of detecting an abnormality in the infrastructure sensor apparatus 10 based on the self position estimation information obtained from the mobile body through communication and the information on the mobile body detected in the sensing range.

Figure 2:
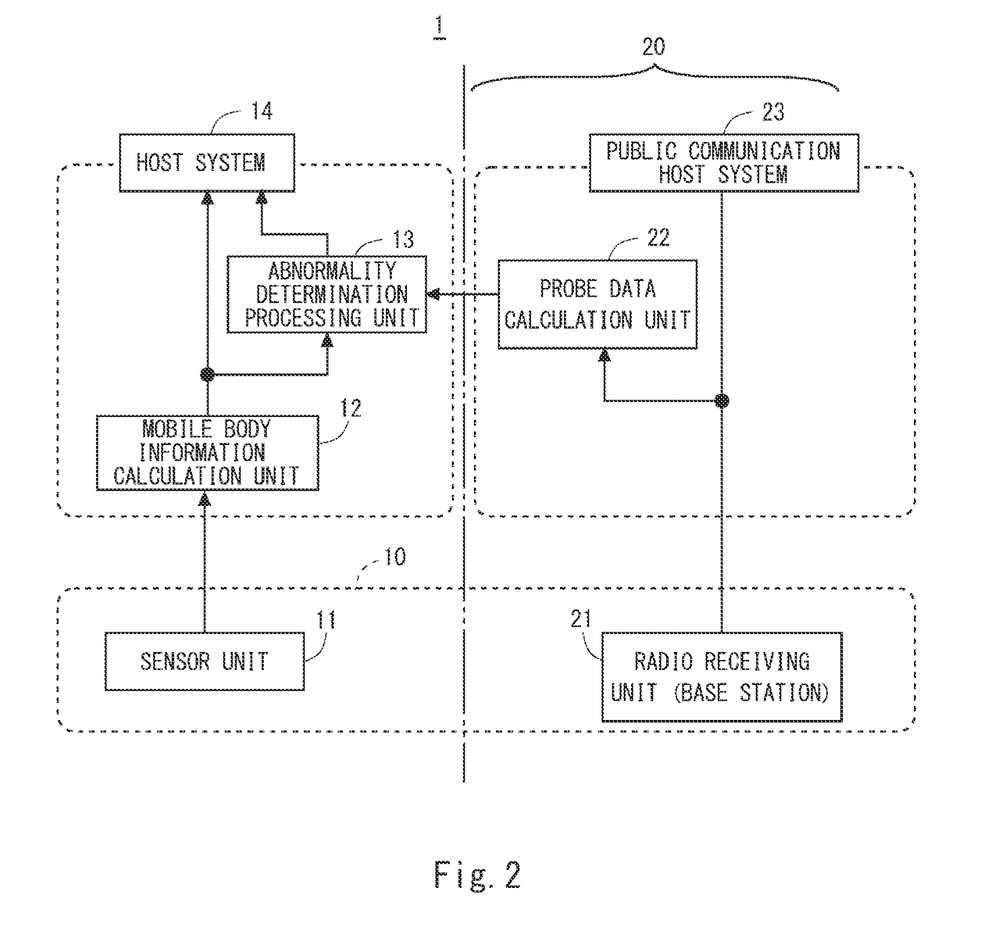
FIG. 2 is a block diagram of an infrastructure sensor system according to the first embodiment.

The infrastructure sensor system 1 will be described further in detail. FIG. 2 shows a block diagram of the infrastructure sensor system 1 according to the first embodiment. As shown in FIG. 2, the infrastructure sensor system 1 according to the first embodiment includes the infrastructure sensor apparatus 10 and a host system 14. Further, the infrastructure sensor system 1 uses probe data calculated in a public communication system 20. That is, the infrastructure sensor system 1 uses a probe data calculation function among the functions included in the public communication system 20 in addition to the infrastructure sensor apparatus 10 and the host system 14.

In the example shown in FIG. 2, the infrastructure sensor apparatus 10 includes a sensor unit 11 and a radio receiving unit 21. The radio receiving unit 21 is a base station used in the public communication system 20. That is, the infrastructure sensor apparatus 10 is provided with some of a plurality of base stations used in the public communication system 20. The radio receiving unit 21 acquires the self position estimation information included in the mobile body by radio communication.

The sensor unit 11 acquires information regarding mobile bodies that move within the sensing range using signals including at least one of a visible light, a near infrared light, a far infrared light, a laser light, and a millimeter-wave light. In other words, the sensor unit 11 acquires area information for grasping the situation within the sensing range set in a predetermined range using a sensor that uses a visible light, a near infrared light, a far infrared light, a laser light, a millimeter-wave light and the like as detection signals. This area information is, for example, image information, object movement vector information etc.

The host system 14 includes a mobile body information calculation unit 12 and an abnormality determination processing unit 13. Further, the public communication system 20 includes a public communication host system 23 and the infrastructure sensor system 1 uses a probe data calculation unit 22 of the public communication host system 23.

The mobile body information calculation unit 12 extracts a mobile body from the area information acquired by the sensor unit 11 and calculates mobile body information at least including positional information and moving speed information of the mobile body. This mobile body information is used in another process block in the host system 14 that is not shown. The probe data calculation unit 22 generates probe data at least including positional information of the mobile body and information on the moving speed of the mobile body calculated from a change in time series of the self position estimation information based on the self position estimation information received by the radio receiving unit 21. Note that the probe data may include identification information on the device associated with the self position estimation information of the mobile body.

The abnormality determination processing unit 13 compares the mobile body information calculated by the mobile body information calculation unit 12 with the probe data acquired from the probe data calculation unit 22 and performs abnormality determination processing for determining that there is an abnormality in the infrastructure sensor apparatus 10 when the mobile body information does not match the probe data. Note that the data compared by the abnormality determination processing unit 13 is limited to an item that is commonly included in the mobile body information and the probe data. Further, since the self position estimation information included in the probe data includes a positioning error, the abnormality determination processing unit 13 may perform comparison processing with high robustness in which the positioning error is taken into account. Further, the result of the determination in the abnormality determination processing unit 13 is transmitted to the process block in the host system 14 (not shown) and the host system 14 performs maintenance processing such as stopping the infrastructure sensor apparatus 10 or invalidating mobile body information obtained in the infrastructure sensor apparatus 10 in accordance with the result of the determination in the abnormality determination processing unit 13.

Figure 3:
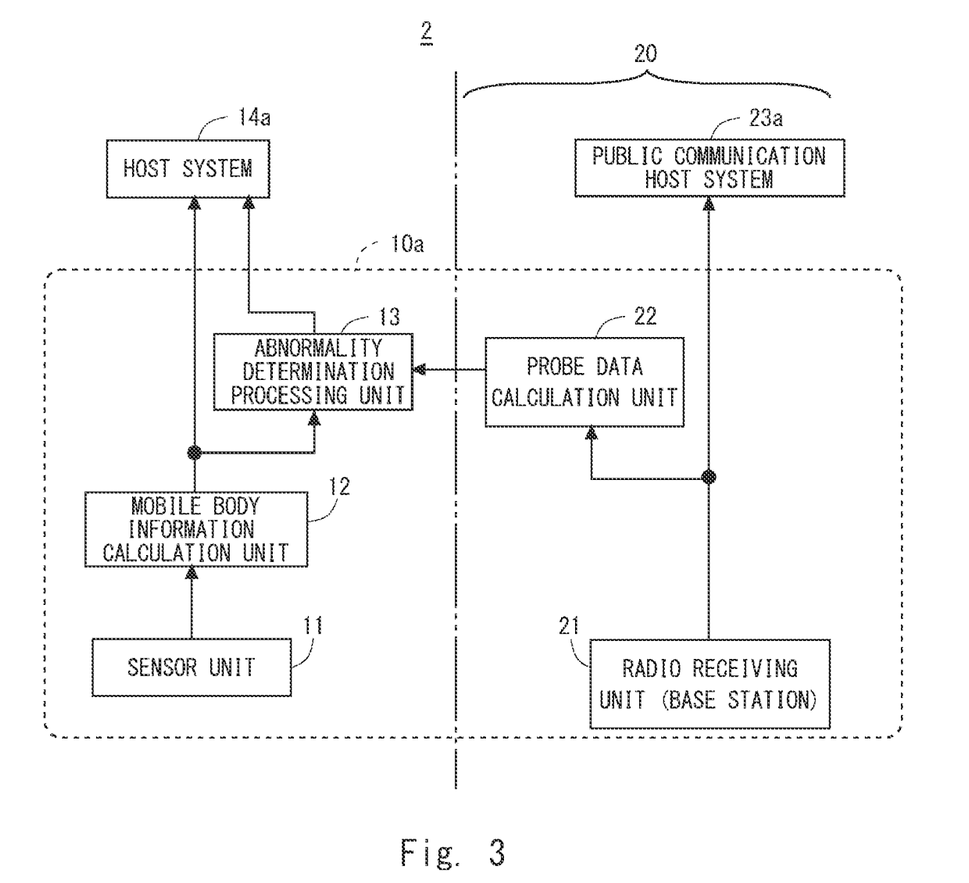
FIG. 3 is a block diagram showing a first modified example of the infrastructure sensor system according to the first embodiment.
Figure 4:
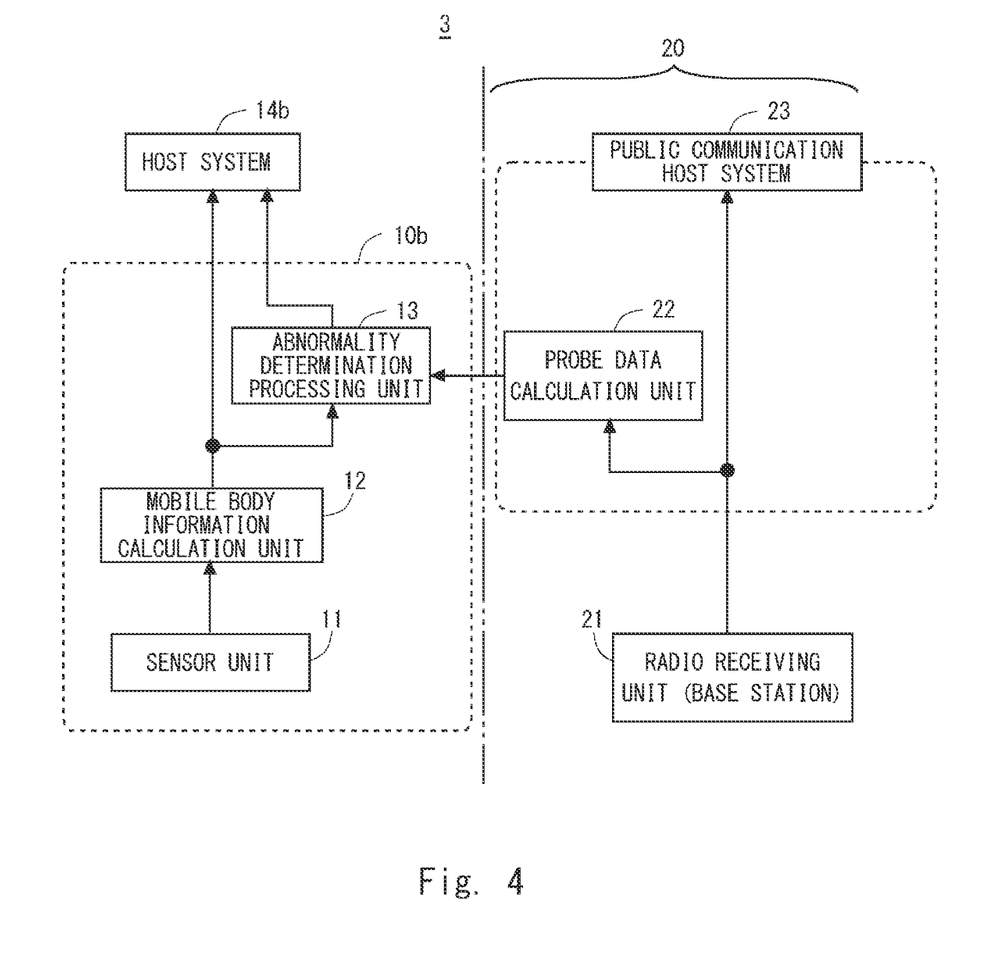
FIG. 4 is a block diagram showing a second modified example of the infrastructure sensor system according to the first embodiment.

The mobile body information calculation unit 12, the abnormality determination processing unit 13, the radio receiving unit 21, the probe data calculation unit 22 and the like may be arranged either on the side of the host system or on the side of the infrastructure sensor apparatus 10. FIGS. 3 and 4 show modified examples of the infrastructure sensor system 1. FIG. 3 is a block diagram showing a first modified example of the infrastructure sensor system according to the first embodiment and FIG. 4 is a block diagram showing a second modified example of the infrastructure sensor system according to the first embodiment.

An infrastructure sensor system 2, which is a first modified example of the infrastructure sensor system 1 shown in FIG. 3, is an example in which the host system 14 is replaced by a host system 14a, the public communication host system 23 is replaced by a public communication host system 23a, and the infrastructure sensor apparatus 10 is replaced by an infrastructure sensor apparatus 10a including a sensor unit 11, a mobile body information calculation unit 12, an abnormality determination processing unit 13, a radio receiving unit 21, and a probe data calculation unit 22.

The infrastructure sensor system 3, which is a second modified example of the infrastructure sensor system 1 shown in FIG. 4, is an example in which the host system 14 is replaced by a host system 14b, and the infrastructure sensor apparatus 10 is replaced by an infrastructure sensor apparatus 10b including a sensor unit 11, a mobile body information calculation unit 12, and an abnormality determination processing unit 13. Further, in the infrastructure sensor system 3, a radio receiving unit 21 is provided independently from the infrastructure sensor apparatus 10b.

Further, as a configuration other than the examples shown in FIGS. 2-4, it may be possible that a provider that operates the infrastructure sensor system 1 alone prepare the radio receiving unit 21 and the probe data calculation unit 22 without using the probe data calculation unit 22 of the public communication system 20 operated by a provider other than the provider that operates the infrastructure sensor system 1. Further, in the examples shown in FIGS. 2-4, cooperation between providers, namely, cooperation in which the provider that operates the infrastructure sensor system 1 acquires the probe data calculation unit 22 from the provider that operates the public communication system 20 using a public communication network or the like, is required.

Figure 5:
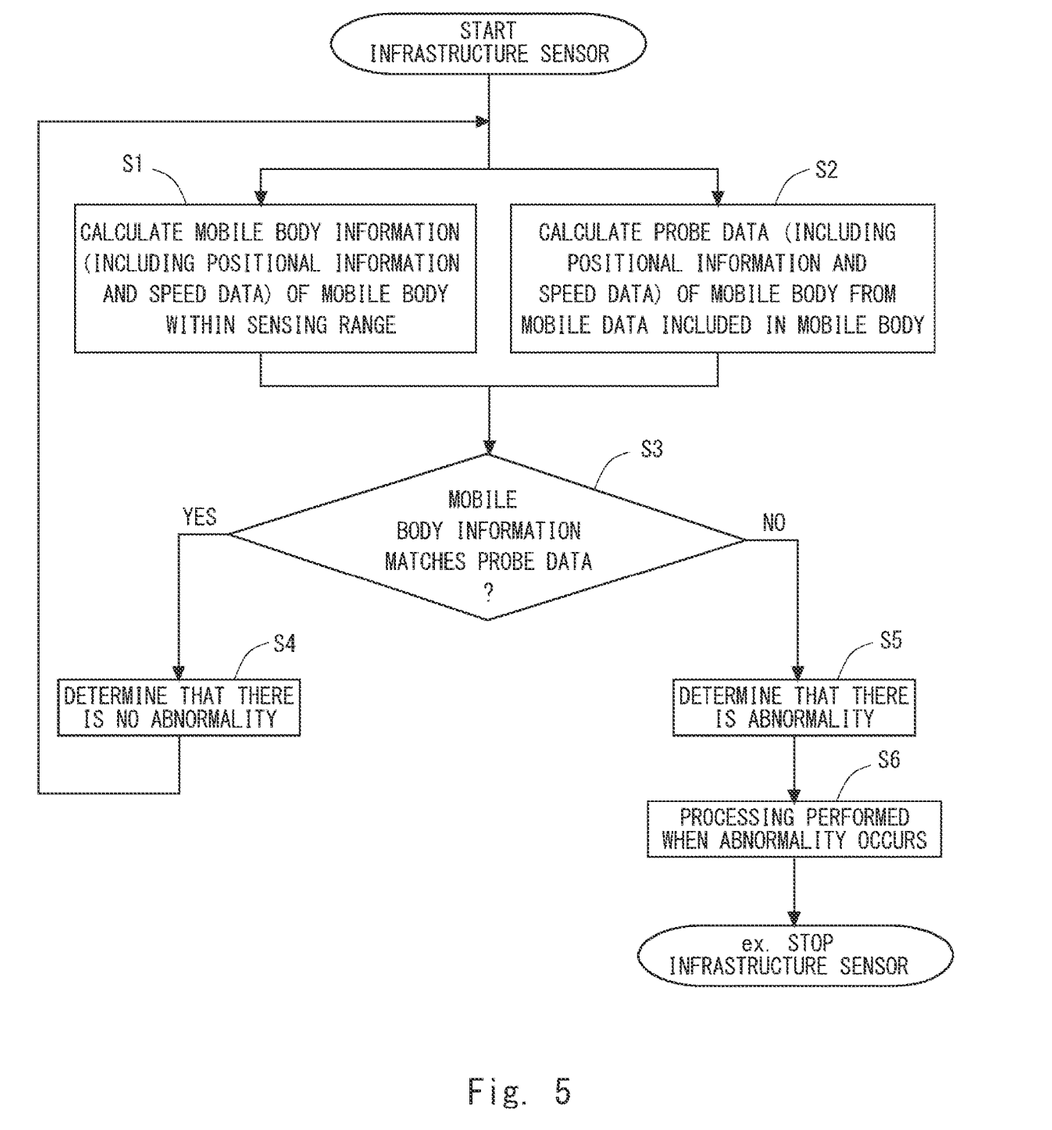
FIG. 5 is a flowchart for describing abnormality determination processing in the infrastructure sensor system according to the first embodiment.

Next, abnormality determination processing in the infrastructure sensor system 1 according to the first embodiment will be described. FIG. 5 shows a flowchart for describing abnormality determination processing in the infrastructure sensor system according to the first embodiment.

As shown in FIG. 5, upon initiating the operation, the infrastructure sensor system 1 according to the first embodiment executes processing of calculating the mobile body information of the mobile body within the sensing range (Step S1) and processing of calculating the probe data of the mobile body based on the mobile data (e.g., self position estimation information) included in the mobile body (Step S2).

Next, the infrastructure sensor system 1 according to the first embodiment compares the mobile body information with the probe data and performs abnormality determination processing (Step S3). When it has been determined, in the abnormality determination processing in Step S3, that the mobile body information matches the probe data, it is determined that there is no abnormality in the infrastructure sensor apparatus 10 (Step S4) and the infrastructure sensor system 1 continues the operation from Step S1. On the other hand, when it has been determined in the abnormality determination processing in Step S3 that the mobile body information does not match the probe data, the abnormality determination processing unit 13 determines that there is an abnormality in the infrastructure sensor apparatus 10 (Step S5). When it has been determined that there is an abnormality in the infrastructure sensor apparatus 10, the host system 14 performs processing performed when an abnormality occurs such as stopping the infrastructure sensor apparatus 10 (Step S6).

From the above description, the infrastructure sensor system 1 according to the first embodiment determines whether or not there is an abnormality in the infrastructure sensor apparatus 10 based on whether the mobile body information calculated based on the information on the mobile body detected using the infrastructure sensor apparatus 10 matches the probe data that can be acquired independently from the operation of the sensor unit 11 of the infrastructure sensor apparatus 10.

As described above, it is determined whether or not there is an abnormality in the infrastructure sensor apparatus 10 based on whether or not the information obtained from different systems match each other, whereby it is possible to determine whether or not there is an abnormality in the infrastructure sensor apparatus 10 without performing complicated processing.

Further, since the infrastructure sensor apparatus 10 is connected to the network, even when a device in the infrastructure sensor apparatus 10 itself is not failed, the area information acquired by the sensor unit 11 may be rewritten due to hacking. The infrastructure sensor system 1 uses mobile data used in the public communication system 20, which is a system which is different from the infrastructure sensor system 1, to determine whether or not there is an abnormality in the infrastructure sensor apparatus 10. Accordingly, in the infrastructure sensor system 1, it is possible to detect an abnormality in the infrastructure sensor system 1 and the infrastructure sensor apparatus 10 due to hacking.

Further, the infrastructure sensor system 1 according to the first embodiment determines whether or not there is an abnormality in the infrastructure sensor apparatus 10 using data of different systems, whereby it is possible to determine whether or not there is an abnormality in the infrastructure sensor apparatus 10 while continuing the operation of the infrastructure sensor apparatus 10 without stopping the infrastructure sensor apparatus 10.

Further, the radio receiving unit 21 and the probe data calculation unit 22 are provided in the infrastructure sensor apparatus 10a shown in FIG. 3. Accordingly, in the infrastructure sensor system 2, the infrastructure sensor apparatus 10 is able to acquire the probe data without making an inquiry to the public communication system 20. It is therefore possible to reduce the load on the network required for the failure determination processing of the infrastructure sensor apparatus and improve the speed of the processing.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An abnormality detection method of an infrastructure sensor apparatus configured to detect a mobile body that passes within a sensing range, the abnormality detection method comprising:
   calculating mobile body information at least including positional information and moving speed information on the mobile body based on information on the mobile body detected by the infrastructure sensor apparatus;
   calculating probe data at least including positional information and moving speed information on the mobile body based on self positional information of the mobile body received using a radio communication function included in the mobile body, wherein the positional information included in the probe data is self position estimation information measured using information obtained from a satellite positioning system obtained by satellite communication or information from a base station of a mobile body communication network; and
   performing abnormality determination processing in which it is determined that there is an abnormality in the infrastructure sensor apparatus when a moving speed of the mobile body calculated from the infrastructure sensor apparatus does not match a moving speed of the mobile body calculated from a change in time series of the self position estimation information in the probe data.

2. The abnormality detection method of the infrastructure sensor apparatus according to claim 1, wherein the probe data is data acquired from a mobile body communication network different from the infrastructure sensor apparatus.

3. The abnormality detection method of the infrastructure sensor apparatus according to claim 1, wherein the abnormality determination processing is performed in the infrastructure sensor apparatus.

4. The abnormality detection method of the infrastructure sensor apparatus according to claim 1, wherein the infrastructure sensor apparatus detects the mobile body within the sensing range based on a signal including at least one of a visible light, a near infrared light, a far infrared light, a laser light, and a millimeter-wave light.

5. The abnormality detection method of the infrastructure sensor apparatus according to claim 1, wherein the self positional information of the mobile body is acquired from the mobile body using a radio communication function provided in the infrastructure sensor apparatus.

6. An infrastructure sensor apparatus comprising:
a sensor unit configured to acquire area information for grasping a situation within a sensing range set in a predetermined range using a sensor;
a mobile body information calculation unit configured to extract a mobile body from the area information and calculate mobile body information at least including positional information and moving speed information on the mobile body;
a probe data calculation unit configured to calculate probe data at least including positional information and moving speed information on the mobile body based on self positional information of the mobile body received using a radio communication function included in the mobile body, wherein the positional information included in the probe data is self position estimation information measured using information obtained from a satellite positioning system obtained by satellite communication or information from a base station of a mobile body communication network; and
an abnormality determination processing unit configured to perform abnormality determination processing for determining that there is an abnormality in the area information acquired by the sensor unit when a moving speed of the mobile body calculated from the infrastructure sensor apparatus does not match a moving speed of the mobile body calculated from a change in time series of the self position estimation information in the probe data.

7. An infrastructure sensor system comprising:
a sensor unit configured to acquire area information for grasping a situation within a sensing range set in a predetermined range using a sensor;
a mobile body information calculation unit configured to extract a mobile body from the area information and calculate mobile body information at least including positional information and moving speed information on the mobile body;
a probe data calculation unit configured to calculate probe data at least including positional information and moving speed information on the mobile body based on self positional information of the mobile body received using a radio communication function included in the mobile body, wherein the positional information included in the probe data is self position estimation information measured using information obtained from a satellite positioning system obtained by satellite communication or information from a base station of a mobile body communication network; and
an abnormality determination processing unit configured to perform abnormality determination processing for determining that there is an abnormality in the area information acquired by the sensor unit when a moving speed of the mobile body calculated from an infrastructure sensor apparatus does not match a moving speed of the mobile body calculated from a change in time series of the self position estimation information in the probe data,
wherein at least the sensor unit is provided in the infrastructure sensor apparatus, the infrastructure sensor apparatus communicating with a host system that performs a plurality of processes regarding an operation of a system and arranged along a road where the mobile body travels.

8. The infrastructure sensor system according to claim 7, wherein at least one of the mobile body information calculation unit and the abnormality determination processing unit is provided in the infrastructure sensor apparatus.

9. The infrastructure sensor system according to claim 7, wherein the probe data calculation unit is provided in a public communication system different from the host system and the host system acquires the probe data from the public communication system.

10. A non-transitory computer readable medium storing an abnormality detection program executed in an arithmetic apparatus provided in an infrastructure sensor system configured to detect a mobile body that passes within a sensing range, the abnormality detection program performing:
mobile body information calculation processing for calculating mobile body information at least including positional information and moving speed information on the mobile body based on information on the mobile body detected by a sensor unit provided in the infrastructure sensor system;
probe data calculation processing for calculating probe data at least including positional information and moving speed information on the mobile body based on self positional information of the mobile body received using a radio communication function included in the mobile body, wherein the positional information included in the probe data is self position estimation information measured using information obtained from a satellite positioning system obtained by satellite communication or information from a base station of a mobile body communication network; and
abnormality determination processing for determining that an abnormality is occurring in the infrastructure sensor system when a moving speed of the mobile body calculated from an infrastructure sensor apparatus does not match a moving speed of the mobile body calculated from a change in time series of the self position estimation in the probe data.

* * * * *